March 10, 1970  M. M. RICHLER  3,499,678
HEATED TRUCK BODY
Filed July 20, 1967

INVENTOR
Max M. RICHLER
ATTORNEY

United States Patent Office 3,499,678
Patented Mar. 10, 1970

3,499,678
HEATED TRUCK BODY
Max M. Richler, St. Laurent, Quebec, Canada, assignor to Atlas Hoist & Body Incorporated, Montreal, Quebec, Canada
Filed July 20, 1967, Ser. No. 654,726
Int. Cl. B60h *1/18;* B62d *33/04;* F24h *3/14*
U.S. Cl. 296—28          4 Claims

ABSTRACT OF THE DISCLOSURE

A heated truck body formed with longitudinally extending duct members under the floor which also support the truck body on the truck chassis. The duct members conduct the hot exhaust gases from the truck engine to heat the floor of the truck body.

---

Figure 1:
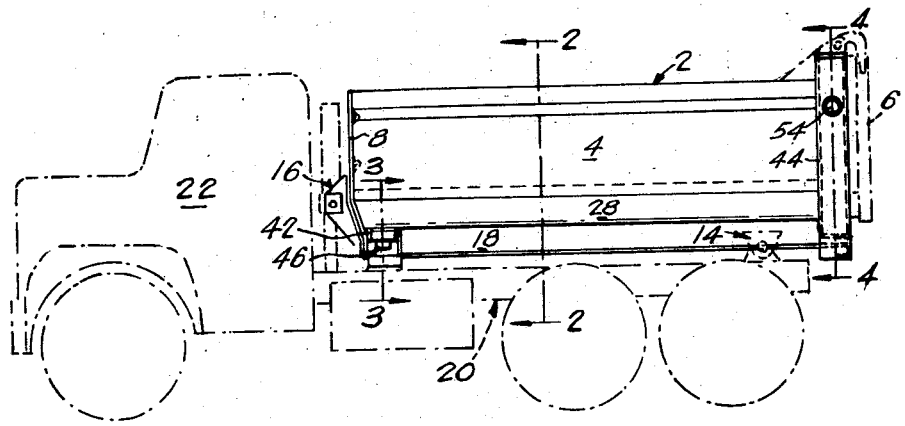

This invention relates to an improved heated truck body.

Difficulty has been experienced when transporting, by truck, materials such as tar or asphalt or damp loads of earth in the winter, in preventing such loads from sticking to the body of the truck when the load has to be dumped out. To overcome the problem, it has been proposed to heat the truck body by using the exhaust gases from the engine of the truck to supply the heat. The exhaust gases heat the floor and usually the side walls of the truck to a sufficient degree to prevent the load from sticking thereto when the load is to be dumped. The heating of the truck body has previously been accomplished in various ways. The prior art has provided double walled truck bodies and means for circulating the exhaust gases through the double wall. However, such a double shell construction is obviously expensive. Another manner of heating a truck body has been to provide a double shell construction wherein the outer shell has corrugations extending over the surface of the truck body to form channels and passing exhaust gases through the channels. Again, such a construction is expensive, and further the heating is very inefficient, since the exhaust gases must follow a tortuous path in passing through all or at least a large number of the channels formed by the corrugations.

One of the most common ways to heat a truck body is to provide numerous U-shaped channels extending transversely across the bottom and up the sides of the truck body and joining the channels together by longitudinal ducting. The exhaust gases of the truck engine are directed through these channels and longitudinal ducts. The U-shaped channels also serve the purpose of reinforcing the structure of the truck body. However, these channels again have the disadvantage in that they provide for inefficient heating. The exhaust gases pass through a tortuous path in going from the front to the back of the truck body, and the available heat is quickly dissipated before the entire truck body can be heated uniformly. The long tortuous path also causes an undesirable back pressure on the exhaust from the truck engine to be built up due to scale forming on the walls of the channels and ducts.

Applicant's invention relates to providing a truck body construction which overcomes the abovementioned problems of the prior art and provides a simple, relatively inexpensive and efficient structure which combines means for heating and supporting the truck body, the heat provided by the exhaust gases of the truck engine.

The applicant provides a truck body comprising side walls, a floor, and laterally spaced, longitudinal duct members extending under the floor of the truck body for substantially its entire length. These straight duct members are hollow and are used to conduct exhaust gases from the truck engine to heat the floor of the truck body. The duct members direct the exhaust gases through in a straight line direction so that the gases do not have to pass through a tortuous path as in the prior art and thus provide inefficient heating and undesirable back pressures on the engine exhaust.

The longitudinal spaced duct members include at least two members which are attached underneath to the floor of the truck body and which support the truck body upon the chassis of a truck. Further longitudinal extending side ducts can be provided where the side walls and the floor of the truck body are joined. It has been found preferable to provide four longitudinally extending ducts.

Figure 2:
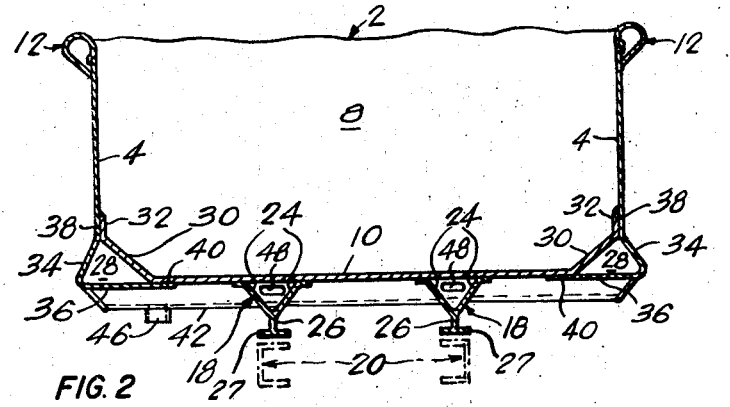
Figure 3:
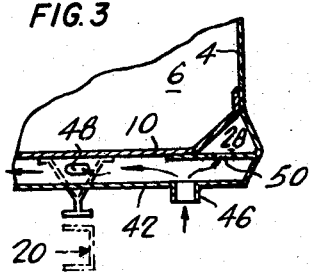
Figure 4:
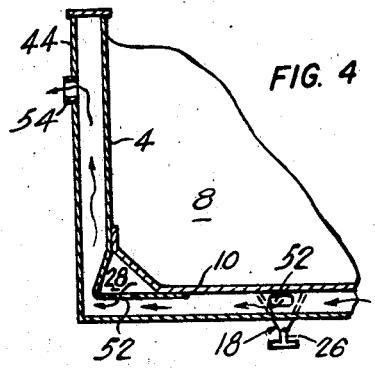

The invention will now be described in detail having reference to the accompanying drawings, in which:

FIGURE 1 is a side elevation view of the truck body;
FIGURE 2 is a cross-section through the truck body along line 2—2 in FIGURE 1;
FIGURE 3 is a partial section through the truck body along line 3—3 in FIGURE 1; and
FIGURE 4 is a partial section through the truck body along line 4—4 in FIGURE 1.

A truck body 2 is provided which has side walls 4, a tail gate 6, a front wall 8, and a floor 10. The side walls may be provided with rolled top edges to provide support flanges 12. The truck body is attached to the truck at pivot means 14 and is pivoted to dump a load by elevating means 16. The truck body 2 has two longitudinal support members 18 attached to the underside of the floor 10. These two members serve to support the truck body upon the chassis 20 of the truck 22. The support members extend in a straight line substantially the entire length of the truck body, and are laterally spaced from each other so as to properly support the truck body on the chassis 20. These support members are made hollow to act as ducts for carrying exhaust gases from the engine of the truck. Preferably, each longitudinal supporting member 18 is made in the shape of a Y channel with the arms 24 of the Y attached by welding to the bottom of the floor 10 of the truck body. The tail 26 of the Y is then attached to the chassis 20 of the truck through the flat horizontal base plate 27 at the end of the tail. The Y construction provides the most efficient manner of forming duct and support members for the truck body. The Y shape provides a large heating area and also sufficient strength to support the truck body.

The duct/support members 18 may be formed in other ways as will be apparent. For example, two channel members could be welded together to form a box member, and the hot gases could be passed through the duct formed by the box member. Alternatively, an I beam could have mounted thereon a channel which faces and is closed against the bottom of the floor. The closed channel provides the duct and the I beam provides the support. The basic requirements in forming the members are that they be strong enough to support a full load in the truck body and yet provide a sufficient duct area to adequately heat a good portion of the floor area of the truck while providing straight-line passage for the exhaust gases.

Preferably, two further straight-line longitudinal extending side ducts 28 are provided, one at each side of the truck body. The side ducts, as shown in FIGURE 2, are preferably formed from the side wall 4 and floor 10 of the truck body. The edge of the floor is bent to provide an angled surface 30. This angled floor surface is further bent to provide a vertical surface 32. The bottom of the wall is bent to provide an angled surface 34 and a horizontal surface 36. The vertical surface 32 is joined to the wall at 38, and the horizontal surface 36 is joined to the floor at 40 by welding. This construction provides a large triangular duct at the corners while maintaining strength at this highly stressed location.

Other types of construction may be used to form the side ducts. For example, a flat plate could be welded at an angle to extend from the floor to the wall to form a simple duct. Alternatively, a channel could be welded to the bottom outer edge of the floor. Other embodiments will be apparent where weight and strength considerations are not important. It is not necessary to have ducts extending up the entire side of the walls of the truck body. The applicant has found that with the side ducts extending only part way up the side wall as shown in FIGURE 2, sufficient heat is provided along the wall by conduction to substantially prevent any load from sticking thereto.

Transversely extending ducts 42, 44 are provided both at the front and back of the truck body to respectively feed and collect the exhaust gases to and from the longitudinal ducts. Preferably, the transverse distributing duct 42 at the front is a U channel welded face up to the bottom of the floor at the front edge of the body. Exhaust gases are fed to this duct through an inlet 46 from the truck engine, and then the exhaust is directed to all four ducts extending underneath the floor of the truck body. The manner of feeding the exhaust from the engine to the front duct can be effected by known means in the art. Apertures 48 are provided in a side wall of the duct 42 to direct the exhaust into the ducts 18, and apertures 50 are provided in the horizontal surface 36 of the side ducts 28 to direct gases therein. The apertures 48, 50, passing the exhaust as shown by the arrows in FIGURE 3 from the distributing duct into the longitudinal ducts, have an area of approximately 150% of the cross-sectional area of the exhaust inlet so that there is no back pressure built up on the exhaust.

The transverse duct 44 shown in FIGURE 4 at the rear of the truck body is a collecting duct which collects exhaust gases through apertures 52 after they have passed through the four longitudinal members. Preferably, the transverse duct at the back extends up both the side walls 4 of the truck body so as to provide additional "wrap-around" support for the tail gate 6 of the truck as shown in FIGURE 1. The exhaust collecting duct at the back preferably is a channel member welded to the walls and bottom of the truck body and provided with an exhaust aperture 54 at the top.

The hot exhaust gases, in passing through the longitudinal ducts, heat the floor and side walls by conduction of the heat through the material of the truck body. Truck bodies are usually constructed of steel which has good heat conduction properties. The truck bodies may be constructed of aluminum which has better heat conduction properties than steel.

The arms 24 of the Y members and the sides 34 and 36 of the triangular ducts enclose enough of the floor area to provide sufficient heating of the truck body. It has been found that good heating of the truck body is obtained when the area of the floor enclosed by the ducts is approximately 40% of the total floor area.

I claim:
1. A truck body comprising side walls, front and back walls and a floor, reinforcing means for the floor, said reinforcing means comprising a first pair of support members connected to the bottom of the floor, a second pair of support members located at the juncture of the side walls and floor of the truck body and extending the length of the floor, the first pair of support members being laterally spaced apart from each other and the side walls, and extending longitudinally of the floor, and each having an integral flat horizontal base spaced below the plane of the floor to directly support the truck body, the first and the second pair of support members forming ducts having an unobstructed passage for substantially the entire length of the truck body floor, said first and second pair of support members enclosing at least 40% of the floor area to provide sufficient reinforcement for the floor and to heat the floor when passing a heating medium through said support members.

2. A truck body as claimed in claim 1 wherein the second pair of support members are integrally formed from the side walls and floor, lower portions of the side walls bent horizontally inwardly toward each other and extending substantially in the same plane as the horizontal plane of the floor, floor portions adjacent the side walls bent upwardly at an angle to the horizontal, the edges of the floor portions attached to the side walls at a line above the horizontal plane of the floor, and the edges of inwardly extending side wall portions attached to the horizontal floor surface, to form triangular shaped side ducts.

3. A truck body comprising side walls, front and back walls and a floor, two straight-line duct members connected to the bottom of the floor, the duct members being laterally spaced apart from each other and the side walls, and extending longitudinally of the floor, the duct members having an integral flat horzional base spaced below the plane of the floor to directly support the truck body, and wherein the two bottom ducts are formed by Y shaped members with the arms of the Y attached to the bottom of the floor, and a flat horizontal plate attached to the free end of the tail of the Y forming the base of the duct.

4. A truck body comprising side walls, front and back walls and a floor, two straight-line duct members connected to the bottom of the floor, the duct members being laterally spaced apart from each other and the side walls, and extending longitudinally of the floor, the duct members having an integral flat horizontal base spaced below the plane of the floor to directly support the truck body, two longitudinally extending side duct members located at the juncture of the floor and side walls of the truck body, the side ducts extending the length of the floor, additional ducts extending transversely to the bottom and side ducts at the front and back of the truck body and connected to the bottom and side ducts, and an inlet opening to the front transverse duct, an outlet opening from the front duct to each of the bottom and side ducts, a further outlet opening from each of the bottom and side ducts to the back duct and an outlet opening from the back duct to the atmosphere, the area of each of the outlet openings from the front duct to the bottom and side ducts being approximately 150% the area of the front duct inlet opening.

References Cited

UNITED STATES PATENTS

| 1,461,907 | 7/1923 | Hughes | 296—28 |
| 3,363,933 | 1/1968 | Wilson | 296—28 |
| 1,942,207 | 1/1934 | Ferwerda | 298—1 |
| 2,974,997 | 3/1961 | Parsley et al. | 296—28.22 |
| 3,331,433 | 7/1967 | Hagberg | 296—28.22 X |

FOREIGN PATENTS

| 746,737 | 3/1956 | Great Britain. |
| 777,265 | 6/1957 | Great Britain. |

BENJAMIN HERSH, Primary Examiner

JOHN A. PEKAR, Assistant Examiner

U.S. Cl. X.R.

126—343.5